US 6,594,247 B2

(12) United States Patent
Perkins et al.

(10) Patent No.: US 6,594,247 B2
(45) Date of Patent: Jul. 15, 2003

(54) NEIGHBOR-ASSISTED CONTENTION RESOLUTION FOR MULTI-USER COMMUNICATION

(75) Inventors: Matthew R. Perkins, Sunrise, FL (US); Vernon Anthony Allen, Sunrise, FL (US); Robert J. O'Dea, Fort Lauderdale, FL (US); Juan Carlos Palacios, Plantation, FL (US); Priscilla L. Chen, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 38 days.

(21) Appl. No.: 09/781,142

(22) Filed: Feb. 12, 2001

(65) Prior Publication Data
US 2002/0110141 A1 Aug. 15, 2002

(51) Int. Cl.[7] .................. H04L 12/403; H04Q 7/28; H04J 3/02
(52) U.S. Cl. .................. 370/341; 370/447; 370/462; 455/520
(58) Field of Search ........................ 370/312, 328, 370/332, 338, 346, 348, 337, 347, 315, 392, 341, 362, 329, 431, 445, 447, 450, 461, 444, 462, 455, 449, 459; 455/423, 426, 455, 520, 11.1, 518, 509; 709/248, 235; 340/10.2

(56) References Cited

U.S. PATENT DOCUMENTS

| 4,553,263 | A | * | 11/1985 | Smith et al. .................. 455/34 |
| 5,481,539 | A | * | 1/1996 | Hershey et al. ............ 370/85.3 |
| 5,729,542 | A | * | 3/1998 | Dupont ........................ 370/346 |
| 6,055,411 | A | * | 4/2000 | Ishida et al. ............... 455/11.1 |
| 6,226,279 | B1 | * | 5/2001 | Hansson et al. ............ 370/329 |
| 6,240,083 | B1 | * | 5/2001 | Wright et al. ............... 370/348 |

* cited by examiner

Primary Examiner—Huy D. Vu
Assistant Examiner—Duc Ho
(74) Attorney, Agent, or Firm—Motorola, Inc.; Andrew S. Fuller; Barbara R. Doutre

(57) ABSTRACT

A contention resolution method includes the steps of determining a contention has occurred and requesting contention resolution from radios in the system (604). Radios in the system receive the request and do not transmit in the next control frame (606). Group leader radios (202, 208 and 214) transmit the identification code they were able to demodulate in the previous frame to the master radio (608). The master radio (212) receives the information from the group leaders and transmits a control-channel access message to one of the contending radios (610).

5 Claims, 5 Drawing Sheets

NEIGHBOR-ASSISTED CONTENTION RESOLUTION FOR MULTI-USER COMMUNICATION

TECHNICAL FIELD

This invention relates in general to the field of radio communications and more specifically to a method for contention resolution in a multi-user communication session.

BACKGROUND

Communication sessions that permit multi-user participation are often plagued by delays that occur due to session-access collisions from multiple users. Most protocols attempt to solve these contentions by using a random backoff scheme that eventually reduces the number of session-access collisions to an acceptable level. However, there is typically a great deal of delay associated with this approach. A need exists in the art for a method of minimizing the contention-resolution delay in modern multi-access communication systems and also reduce the number of session-access collisions.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
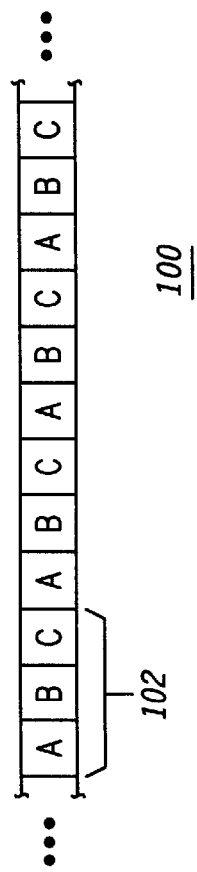
FIG. 1 shows a diagram of subgroup time slots embedded in a PMR control-channel.

While the specification concludes with claims defining the features of the invention that are regarded as novel, it is believed that the invention will be better understood from a consideration of the following description in conjunction with the drawing figures, in which like reference numerals are carried forward.

The present invention utilizes the spatial diversity of neighboring system devices to help resolve session-access contentions that occur in a multi-user communication environment. According to the preferred embodiment, a communication system has "N" devices (e.g., portable radios, etc.) such that one device is a "master device" and "n" devices serve as group leaders for the remaining N-(n+1) system devices. In the event that two or more system devices contend for the same time or frequency slot (depending on the type of system, e.g., time-division multiple access (TDMA), etc.) every device in the system will attempt to help resolve the contention.

First, if the master device can not successfully decipher a device's identification number (ID) during a typical transmission, it will be assumed that a contention exists and the master will transmit a request for contention resolution. When the radios receive this request, the "n" group leaders will transmit to the master radio any device ID they had been able to decode while monitoring the communication channel. Typically, the closer one of the group-leader radios is to one of the contending radios, the greater the probability that the group lender radio is able to decode the ID of one of the contending radios. The master device that will then grant channel access to the device with the highest priority level (e.g., radio used by a manager, etc.) based on the radio ID's received back from the group leader radios.

In an alternate embodiment, any one of the radios in the system, not only the group-leader radios can send back radio identification information from the contending radios they were able to decode, back to the master radio. In order to avoid contentions between more than one radio attempting to transmit information back to the master radio, as one example, the radios can be assigned priority levels, and those radios with higher priority are allowed to transmit back earlier than those with lower priority levels. In a further embodiment, only if the group leaders were not able to decode radio-identification information from at least one of the contending radios, will any of the other radios in the system be allowed to transmit information to the master radio.

To illustrate how this method may be applied, we will examine the use of the above-discussed method in a Public Mobile Radio (PMR) system. In this embodiment, the method of the present invention will be applied to a trunked radio system and its multi-user session feature, referred to as a "group call". It should be noted that the use of this invention is not limited to use in a PMR system. The following scenario only serves as one example of the present inventions numerous applications.

Trunked-radio systems that includes a "group call" feature that allows several radios to be assigned to a group in a particular communication channel, problems arise when multiple radios in the system try to simultaneously access the same control-channel time-slot. When this happens, the contending radios will "randomly back-off" some predetermined period of time, "$t_{rand}$", and re-transmit their requests for control-channel access. The radios may have to compete with other system users and in the unlikely event that the back-off time for one user, referred to as "$t_{rand-user1}$" equals the back-off time for a second user, referred to as "$t_{rand-user2}$", both radios may have to compete with each other a second time. As the number of collision incidents increase, so will the allotted back-off time, which will ultimately reduce system throughput.

The neighbor-assisted contention resolution method of the present invention is applied in the preferred embodiment to a trunked radio system that employs a control-channel time-slot architecture as shown in FIG. 1. The control-channel 100 is broken down into three user groups that are labeled A, B and C, which together make one control-channel frame 102. These use- group slots serve as access bins for control-channel access, but more importantly, they serve as access bins for the group leaders during contention resolution.

Figure 2:
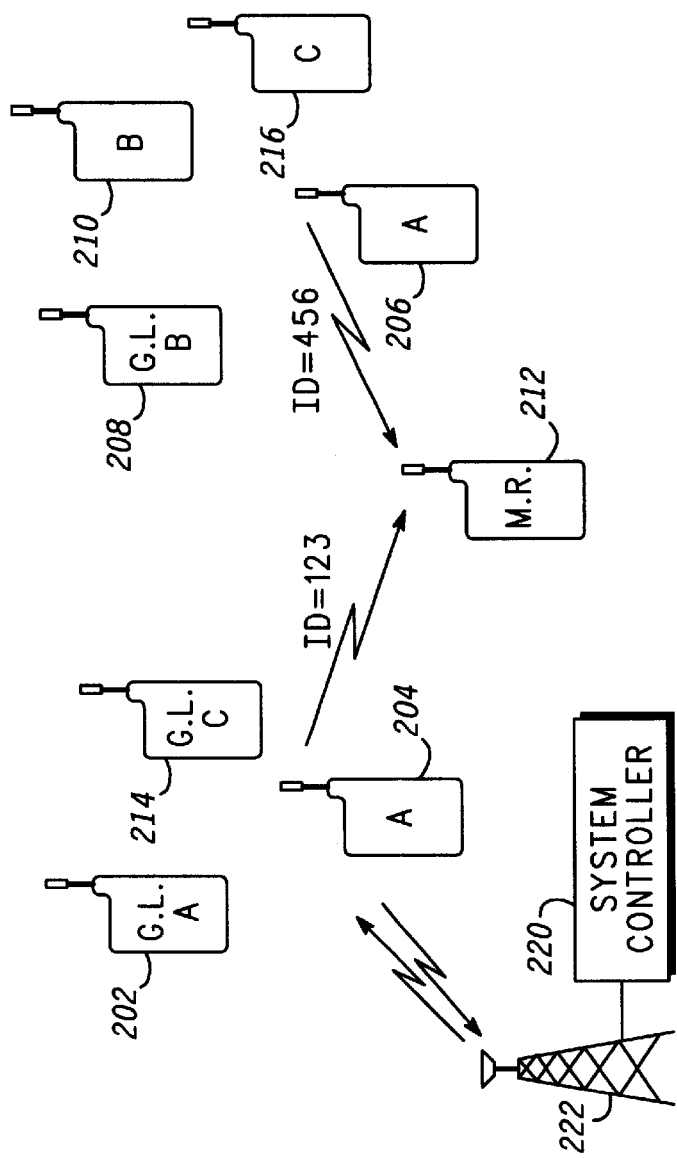
FIG. 2 shows a communication system in accordance with the invention.
Figure 3:
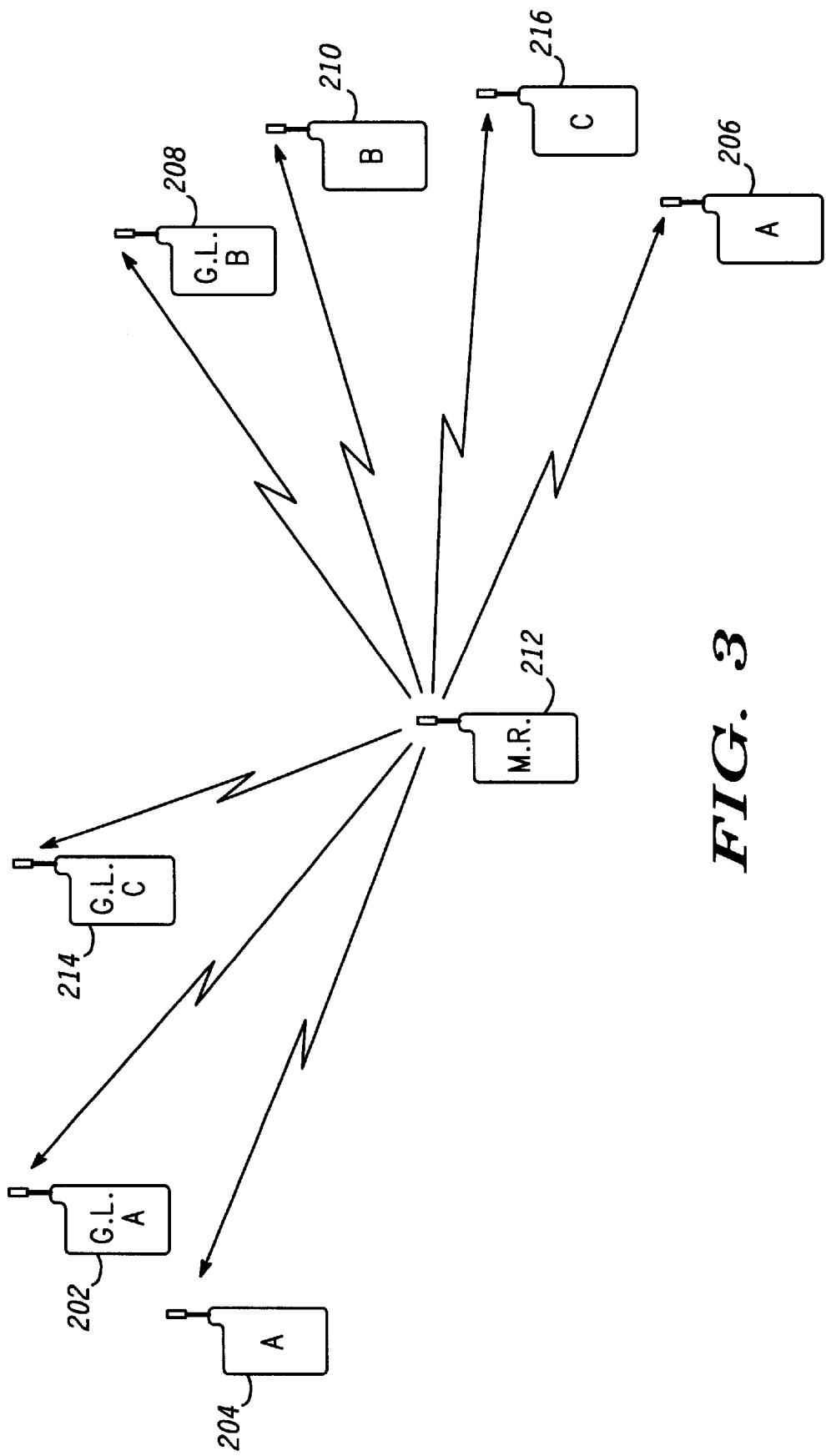
FIG. 3 illustrates the master radio transmitting a request for contention resolution in accordance with the invention.

The control-channel provides information to radios operating in the system. Control-channel information (also known as outbound signaling words or OSW's), for example, inform radios when to change channels automatically so as to communicate with other members in the same radio talk group over an assigned voice/data channel assigned by the trunk system's central controller. As an example, assume eight radio users 202, 204, 206, 208, 210, 212, 214 and 216, belong to one of the three previously mentioned user groups, A, B, or C, and each user group has a radio acting as a group leader (G.L.). Group A's group leader is radio 202, group B's group leader is radio 208, and group C's group leader is radio 214. At time $t=t_1$ shown in FIG. 2, two radios 204 and 206 from talkgroup "A" attempt to simultaneously access the trunk system's control-channel which results in a control-channel access collision. Master radio (M.R.) 212 immediately detects the collision and broadcasts a request for contention-resolution assistance as depicted in FIG. 3. Upon receipt of this signal, every radio in the system, excluding the group leaders, radios 202, 208 and 214, is directed to be dormant during the next control-channel frame. At that time, the group leader radios 202, 208 and 214, prepare to transmit the radio-interrupt code that they demodulated during the last control frame.

Figure 4:
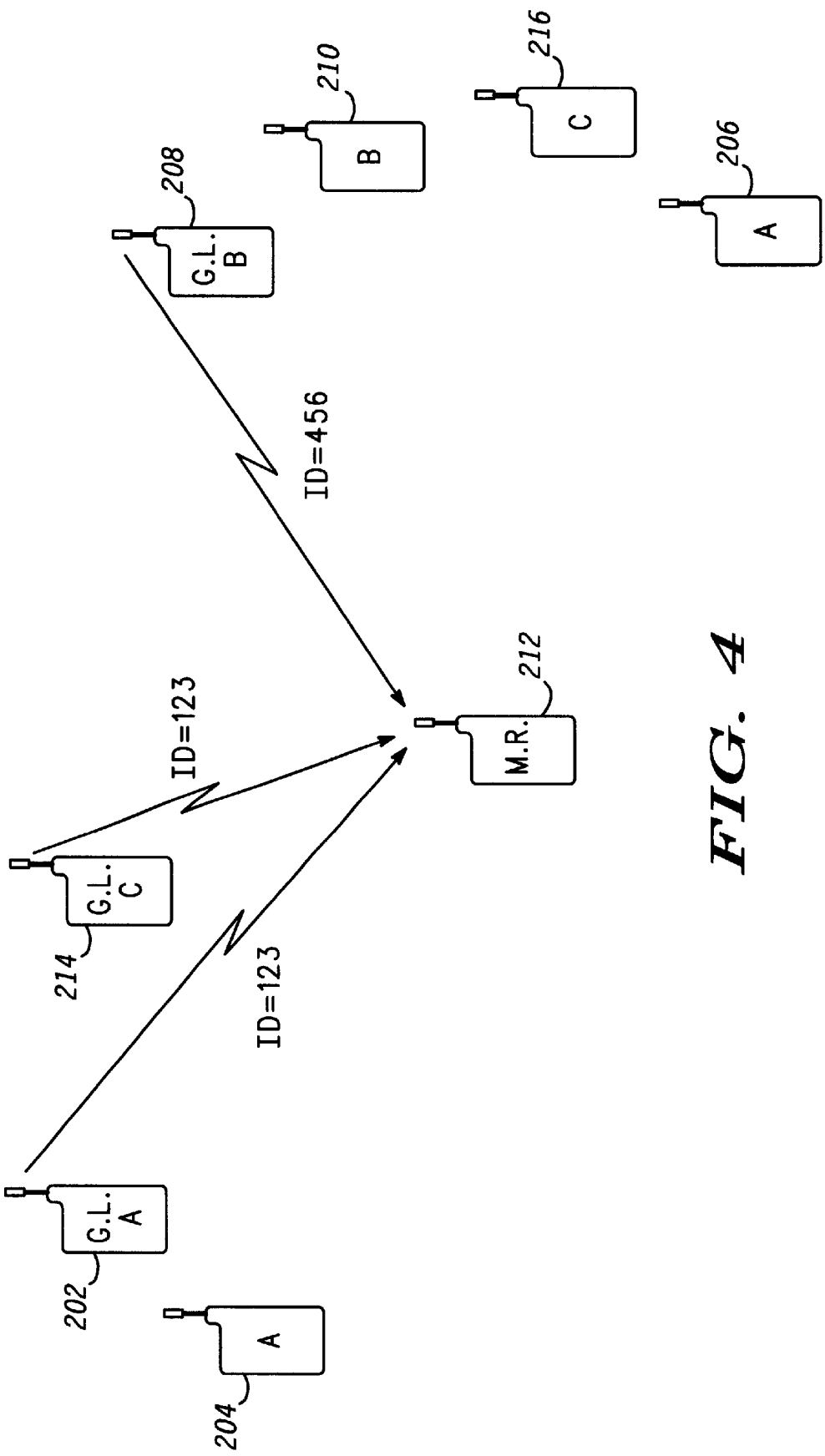
FIG. 4 illustrates the group leader radios transmitting to the master radio the radio ID that they demodulated in accordance with the invention.
Figure 5:
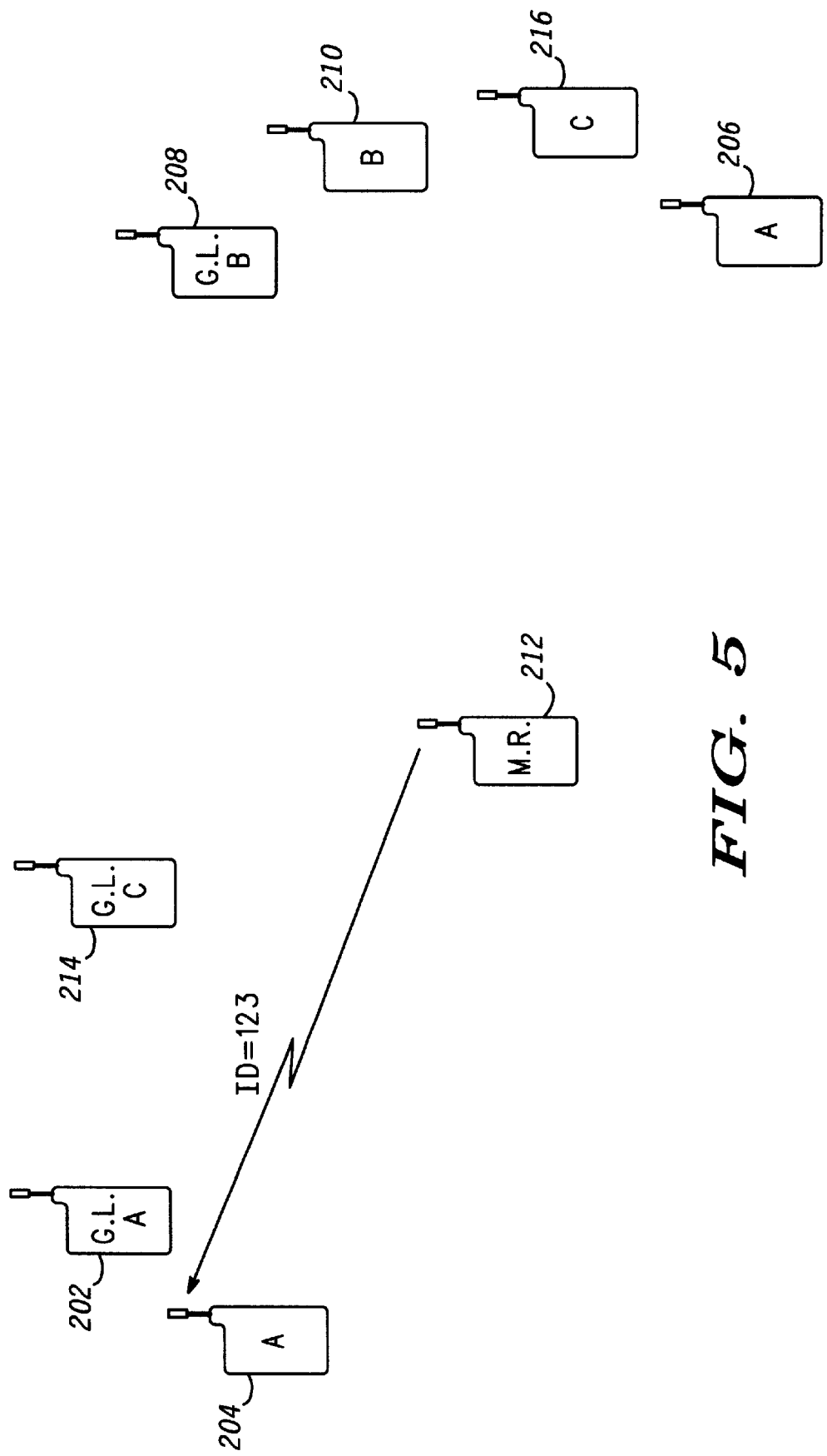
FIG. 5 illustrates the master radio assigning control-channel access to one of the contending radios in accordance with the invention.

Since the group leaders 202 and 214, for groups "A" and "C" respectively, are physically closer to radio 204, they will likely demodulate ID=123. As a result, they will transmit ID=123 in accordance with the preferred embodiment of the invention. Conversely, radio 208, the group leader for radio group "B" is closer to radio 206 that transmitted radio ID=456, so group leader 208 will report ID=456 as depicted in FIG. 4. Upon receiving these radio ID's the master radio 212 will give control-channel access to the radio with the highest priority, in this particular example as shown in FIG. 5, channel priority is given to radio 204 that has radio ID=123. The priority level of a radio can be preassigned based on any number of things, for example, the job function of the radio user, employment level of a particular radio user, etc.

Figure 6:
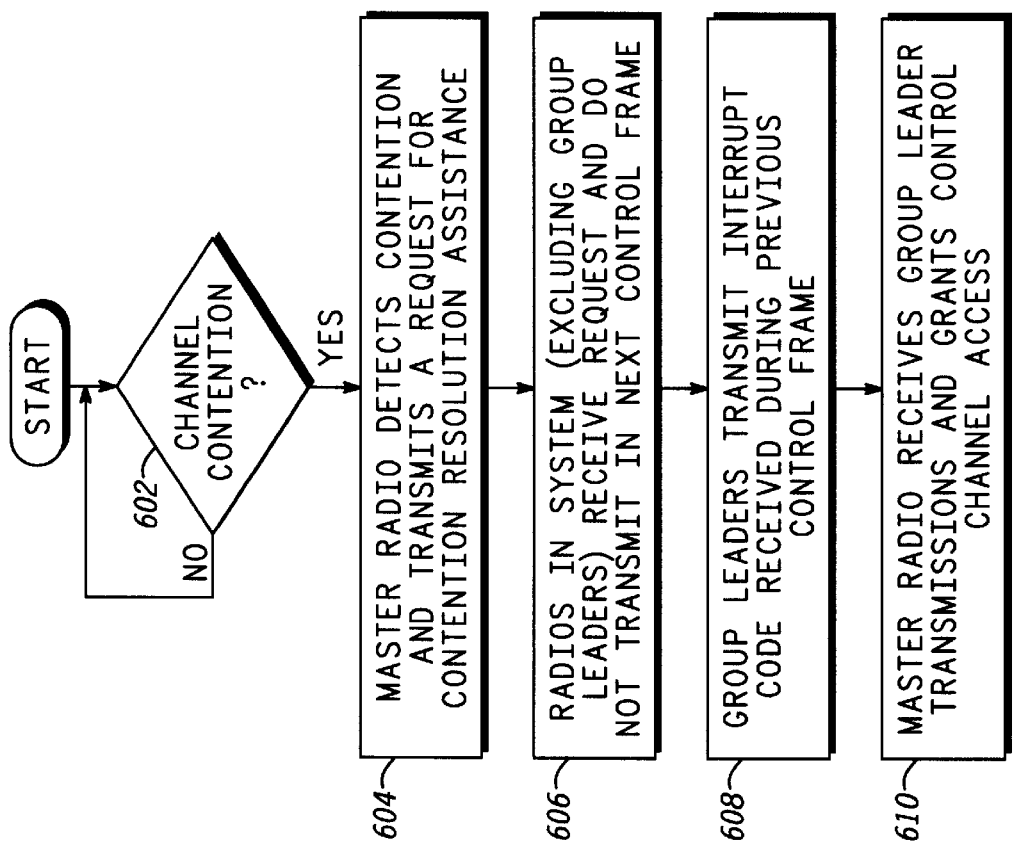
FIG. 6 shows a flowchart highlighting the steps taken in accordance with the invention.

In FIG. 6, a flowchart highlights the steps taken in accordance with the preferred embodiment of the invention. In step 602, it is determined whether or not a channel contention has occurred. In step 604, the master radio 212 detects the channel contention and transmits a request for contention-resolution assistance. While in step 606, the radios in the system receive the request and do not transmit (excluding group leaders 202, 208 and 214) in next control-channel frame. In step 608, only the group leader radios 202, 208 and 214 transmit the interrupt-identification code received during the previous control frame. Master radio 212, in step 610, upon receiving the information from the group-leader radios, transmits and grants control-channel access to one of the contending radios, in this example, radio 204.

Although the above example did not illustrate the use of non-group leader radios providing contention resolution, as was provided by the group leader radios, they can also be used depending on the system design. In an alternate design, non-group leader radios can also provide radio information to the master radio they were able to decode in the event that the group-leader radios were unable to demodulate a valid radio ID, due to interference, distance, etc. It is also worth noting that although the preferred embodiment has described a control-channel contention resolution, the present invention is not so limited and can be used in systems that do not have a control channel.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for contention resolution in a radio system having a plurality of radios, at least one radio designated as a group leader, and one radio from amongst the plurality of radios is designated a master radio, the method comprising the steps of:
    (a) detecting at the master radio that a channel contention has occurred between at least two radios in the radio system;
    (b) broadcasting to the plurality of radios, by the master radio, a message for contention assistance;
    (c) transmitting by the at least one group-leader radio to the master radio the radio-identification information it was able to receive from at least one of the two radios that is in contention;
    (d) transmitting a channel-access grant message to one of the contending radios by the master radio based on the radio-identification information transmitted by the at least one group leader radio; and
    comprising the further step of:
        (b1) disabling transmissions in all of the plurality of radios except for the at least one group leader for a predetermined period of time upon the plurality of radios receiving the transmission in step (b).

2. A method as defined in claim 1, wherein the radio system comprises a trunked radio system having a control-channel and in step (b1) the radios disable transmissions for the next control-channel frame after receiving the message in step (b).

3. A method for contention resolution in a radio system having a plurality of radios, at least one radio designated as a group leader, and one radio from amongst the plurality of radios is designated a master radio, the method comprising the steps of:
    (a) detecting at the master radio that a channel contention has occurred between at least two radios in the radio system;
    (b) broadcasting to the plurality of radios, by the master radio, a message for contention assistance;
    (c) transmitting by the at least one group-leader radio to the master radio the radio-identification information it was able to receive from at least one of the two radios that is in contention;
    (d) transmitting a channel-access grant message to one of the contending radios by the master radio based on the radio-identification information transmitted by the at least one group leader radio; and
    comprising the further step of:
        (b2) disabling transmissions in all of the plurality of radios except for the at least one group leader for a predetermined period of time upon the plurality of radios receiving the transmission in step (b).

4. A method as defined in claim 3, wherein the predetermined period of time that the plurality of radios have their transmissions delayed is one control frame sent by the control-channel.

5. A method for contention resolution in a radio system having a plurality of radios, and at least one radio from amongst the plurality of radios is designated a master radio, the method comprising the steps of:
    (a) detecting at the master radio that a channel contention has occurred between at least two radios in the radio system;

(b) broadcasting to the plurality of radios, by the master radio, a message for contention assistance;

(c) transmitting by at least one radio from amongst the plurality of radios to the master radio the radio-identification information it was able to receive from at least one of the two radios that is in contention;

(d) transmitting a channel-access grant message to at least one of the contending radios by the master radio based on the radio-identification information transmitted in step (c); and wherein in response to receiving the contention assistance message transmitted in step (b) the method comprises the further step of:

(b1) disabling transmissions during step (c) in all of the plurality of radios except those from amongst the plurality of radios that in step (c) were able to successfully receive the radio-identification information from at least one of the radios in contention.

* * * * *